May 29, 1934.  H. C. DRAKE  1,960,968
FLAW DETECTOR UNIT
Filed June 6, 1931   2 Sheets-Sheet 1
Fig.1.
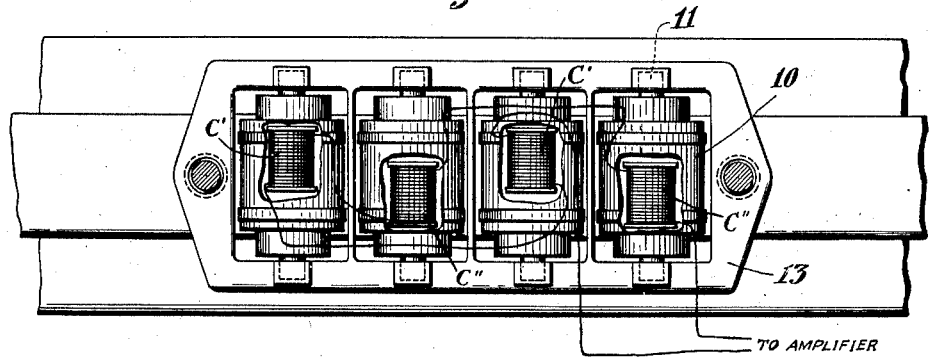
Fig.2.
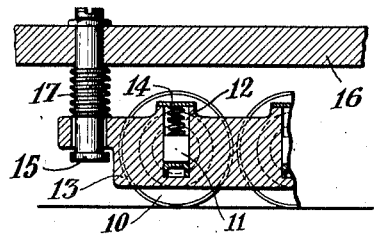
Fig.3.
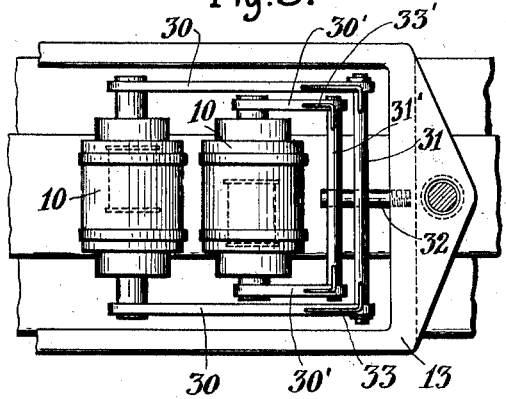
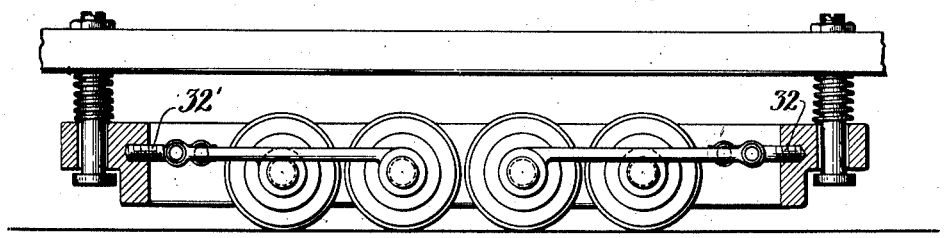
Fig.4.
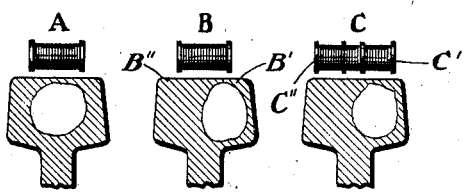
Fig.9.
INVENTOR
Harcourt C. Drake
BY
ATTORNEY May 29, 1934.  H. C. DRAKE  1,960,968
FLAW DETECTOR UNIT
Filed June 6, 1931   2 Sheets-Sheet 2
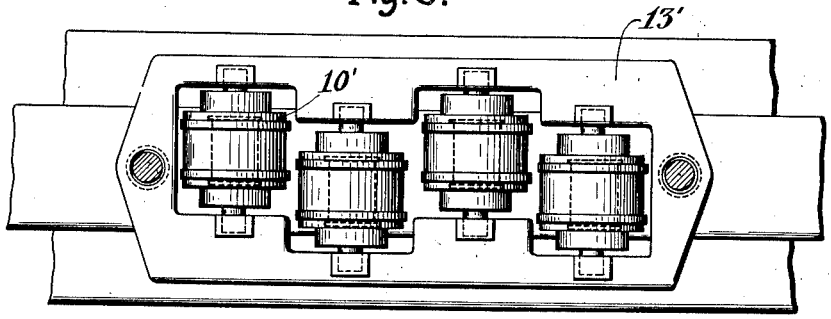
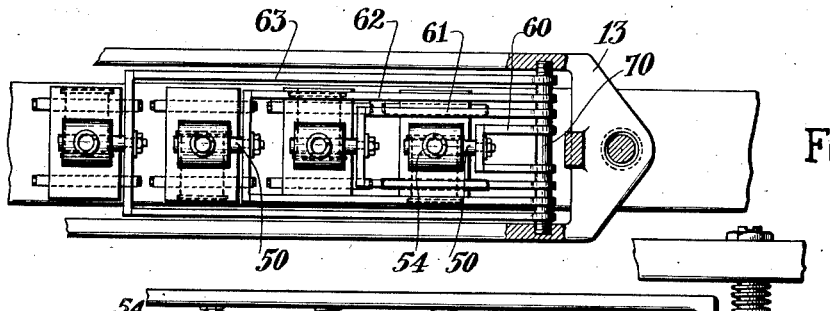
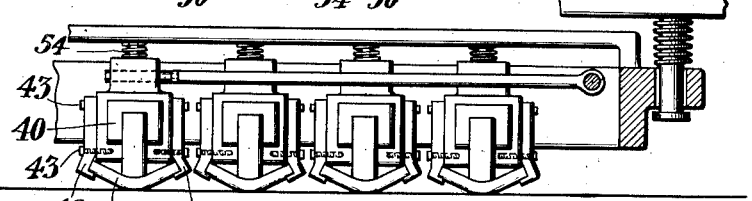
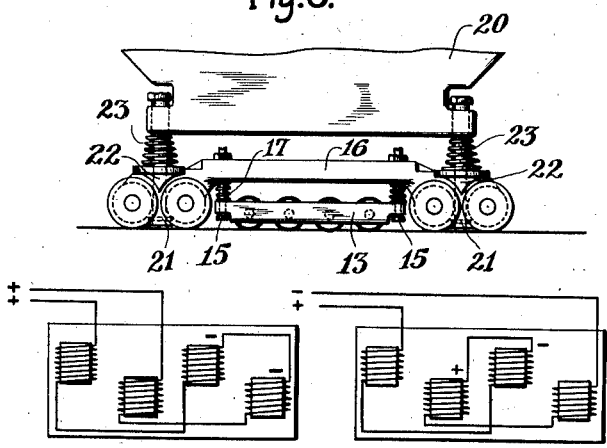
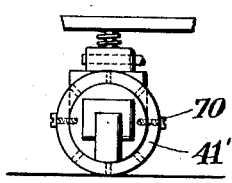
INVENTOR
Harcourt C. Drake
BY Joseph H. Lipschitz
ATTORNEY Patented May 29, 1934

1,960,968

UNITED STATES PATENT OFFICE 1,960,968

FLAW DETECTOR UNIT

Harcourt C. Drake, Hempstead, N. Y., assignor to Sperry Products, Inc., Brooklyn, N. Y., a corporation of New York Application June 6, 1931, Serial No. 542,531

15 Claims. (Cl. 175—183)

My invention relates to means for detecting flaws in metallic conductors, particularly in steel rails, by means of the mechanism disclosed in the patent to Elmer A. Sperry, No. 1,820,505, granted August 25, 1931, for Fissure detector for metals. As disclosed in said application, the principle of flaw detection here involved consists in sending a current of high amperage through the conductor to establish an electro-magnetic field surrounding the same, and then operating a detector mechanism consisting of a pair of opposed induction coils in close proximity to the rail surface and having a constant relation thereto. Any flaw within the conductor will cause a displacement of the current axis and, therefore, of the electromagnetic field, and such displacement will cause a differential E. M. F. to be induced by the said opposed coils, which induced E. M. F. may be amplified and caused to operate a suitable indicating or recording mechanism.

It has been found, however, that certain internal flaws have been missed by the detecting apparatus when utilized in rail service. After investigation, the cause of it was discovered and can best be explained by reference to views A and B of Fig. 9. A flaw that is substantially centrally located causes a diminution of flux above the flaw, which will cause the coil A as it moves over the rail surface to induce a different current than normally because of the displaced axis of the current and, therefore, of the diminished flux in the upper part of the rail head. It was found, however, that when a flaw occurred at an extreme side of the rail head the diminution of flux above the flaw at one side, as, for instance, at the point marked B', was counter-balanced by an increase in flux at the other side of the rail head in the vicinity of point B''. The result of this was that the total flux across that portion of the rail head traversed by the detector coil was substantially the same as normally, the diminution at one side being compensated for by the increase in flux at the other side. As a result, the coil, when passing over a flux positioned as in view B, failed to indicate a flaw.

It is the principal object of this invention, therefore, to provide a solution for the difficulty set forth in the preceding paragraph and this solution was found to consist in the provision of a plurality of pairs of detector coils co-acting with the respective longitudinal sections of the rail surface, so that each pair acts independently to the extent that it picks up the increase or diminution at one side, and it is therefore not possible for the increased flux at one side to counter-balance the decreased flux at the other side.

A further object of my invention is to provide suitable bearing surfaces for the detector coils which will insure a substantially constant positioning of the coils with respect to the rail surface.

A further object of my invention is to provide an improved mounting for the coils employed as hereinbefore described.

Further objects and advantages of this invention will become apparent in the following detailed description thereof.

In the accompanying drawings,

Fig. 1 is a plan view of a detector unit cut off from its supporting carriage and having parts broken away to disclose the novel positioning of the plurality of pairs of detector coils.

Fig. 2 is a vertical section through a portion of the Fig. 1 detector unit, disclosing one method of mounting the detector coils.

Fig. 3 is a plan view of a portion of a modified detector unit, showing independently mounted detector coils, each having provision for limited universal movement.

Fig. 4 is a front elevation, partly sectioned vertically, of the Fig. 3 form of the invention.

Fig. 5 is a view similar to Fig. 1, showing a modified form of detector unit operatng on the same principle as the Fig. 1 form.

Fig. 6 is a plan view of still another modification of detector unit, showing independently mounted detector coils as in the Fig. 3 form.

Fig. 7 is a front elevation of the Fig. 6 form of the invention, showing also sliding or contacting members for insuring a constant relationship between the coils and the contacting surface.

Fig. 8 is a front elevation of a suitable mounting for the detector units shown in Figs. 1 and 5.

Fig. 9 is a group of three diagrammatic sketches illustrating the principle involved in this invention.

Fig. 10 is a front elevation of a modified form of runner for a detector coil.

Fig. 11 is a wiring diagram showing the two pairs of coils connected in opposition.

Fig. 12 is a view similar to Fig. 11 but showing the coils arranged so that their output is additive.

Referring again to Fig. 9 of the drawings, it will be seen that by providing two coils C' and C'' which overlap at their inner ends but which co-act mainly with respective sides of the rail head, such coils will pick up any variations in flux whether occurring at the center, or at either side, or at both sides of the rail head.

I have therefore modified the detector unit shown in the said Patent No. 1,820,505, by providing two pairs of detector coils in place of but a single pair, and so mounting said coils that each pair co-acts with a respective longitudinal section of the rail surface. Referring to Fig. 1, I have shown the two pairs of coils, one pair indicated by the letter C' and the other pair indicated by the letter C'', the pair of coils C' co-acting with one side of the rail head while the pair of coils C'' co-acts with the other side of the rail head, the areas surveyed by said pairs of coils overlapping so that no part of the rail surface is excluded from the searching operation. The coils are thus arranged with respect to each other laterally across the rail and across the direction of relative movement between the coils and the rail. Each coil may be mounted by means of trunnions in a contacting cylinder 10, each of which cylinders may be journalled for vertical movement by means of trunnions 11 operating in vertical guideways 12 in the detector unit frame 13 against the action of restoring springs 14. Each of said cylinders and, therefore, each coil, may adjust itself to the vertical irregularities in the rail surface as the detector carriage operates along the rail surface to maintain the vertical distance between the rail surface and the coil constant. The detector unit may be so mounted as to adjust itself to inclinations in the rail surface by means of bolts 15 (see Fig. 8) whereby said unit is suspended from the detector carriage 16, said bolts being freely slidable in the detector unit 13, which is held in lowered position against the bolt head by means, such as springs 17. The detector carriage 16 may be mounted on the main brush carriage 20 by means of pivots 21 on bolts 22, said pivots being closely adjacent the rail surface so that inclinations of the rail surface do not cause substantial displacement of the detector unit. Springs 23 press said detector carriage into engagement with the rail surface. This mounting is more fully described in the patent to George L. Jones, No. 1,937,760 granted Dec. 5, 1933, for Flaw detector cars.

The coils of the pair C', C' and of the pair C'', C'' are connected in series and the pairs of coils are also connected in series, so that any flaw at either side will cause an actuation of the amplifier. It will be apparent that should a flaw occur which will cause both pairs of coils to detect the same, one pair of coils will reach the defective portion of the rail before the other pair, so that there would be successive actuations of the amplifier. I cause the coils to be so positioned that the differential E. M. F. (and, therefore, the output of the amplifier) due to the second pair of coils comes in at a time such that it re-enforces the differential E. M. F. (and, therefore, the output of the amplifier) due to the first pair of coils, and hence but a single but much stronger indication of flaw is obtained from the amplifier. A suitable positioning for accomplishing this purpose I have found to be approximately 3 to 3½" between the coils of each pair, and the coils of the second pair to be approximately 1½" behind the respective coils of the first pair. In other words, the coils of the second pair are symmetrically staggered with respect to the coils of the first pair.

Instead of the mounting shown in Fig. 1, I may provide the mounting shown in Fig. 5, which is the same except that since the coils do not extend the entire length of the cylinders, the cylinders 10' differ from cylinders 10 in that they are of a length only sufficient to accommodate the detector coils, and the frame 13' of the detector unit is provided with suitable cut-out portions within which are supported the shorter cylinders.

A still further modification of mounting is shown in Fig. 3, wherein each coil is mounted for limited universal movement and therefore the elaborate mounting shown in Fig. 8 for securing such limited universal movement need not be employed unless desired. In the Fig. 3 form it will be seen that each cylinder 10 with its detector coil is pivotally mounted by means of a bail or frame comprising arms 30 and cross-bar 31 on a fixed post 32 screwed into the detector unit frame 13. The frame 30', 31' of the next coil is fitted within the area enclosed by frame 30, 31 and is pivoted upon the same post 32. The arms 30, 30' are pivotally connected to their cross-bars 31, 31' to permit vertical movement against the restoring action of springs 33, 33', while the pivotal mounting on stub shaft 32 permits movement about a longitudinal axis, to yield an independent limited universal movement for each coil. The frames of the two coils at one side of the detector unit are pivotally mounted on stub shaft 32, while the frames of the two coils at the other side of the unit are mounted on stub shaft 32' (see Fig. 4).

Referring now to Figs. 6 and 7, I have disclosed a form of detector coil which has sliding engagement with the rail surface instead of rolling engagement, as in the case of the Figs. 1, 3 and 5 forms of the invention. The coils are positioned, however, in staggered pairs as in the other forms of the invention, and in that respect act in the same manner. It will be understood that the forms of the invention shown in Figs. 1, 3 and 5 may be adapted to the Figs. 6 and 7 form by mounting the coils within a block 40, said block having fixed to the bottom thereof slides 41 in the form of exceptionally hard strips made, for example, of manganese steel, and which are releasably held in place by means such as locking strips 42 at each side, held in position by means such as screws 43. When the slides 41 become worn to an appreciable degree, the locking strips 42 may quickly be released and new slides inserted in position. As shown in Fig. 6, a slightly modified mounting over that in Fig. 3 is disclosed, the coil and its block 40 and slide 41 being swivelly mounted upon the end of a rod 50 so that it may move around a longitudinal axis. Said rod 50 may be carried by a bail 60 pivotally mounted on a cross-bar 70 fixed in the frame 13. All of the bails 60, 61, 62, 63 may be pivoted on the same rod 70. A universal mounting of each coil is thus obtained in this case as in the Fig. 3 form of the invention. The movement of the coils is against the action of suitable springs 54 which tend to maintain the slides 41 in firm engagement with the rail surface.

In a modified form of the invention disclosed in Fig. 10, I employ circular slides 41' which are locked in place by any suitable means such as set-screws 70 which may be released when desired, so that the slides may be rotated to bring a new portion of the periphery thereof into sliding engagement with the rail surface. Thus an economical use of the slide is obtained.

I may wire the plurality of sets of coils so that on encountering a flaw the generated E. M. F.'s which go into the amplifier before operating the indicator or recorder are either additive as shown in Fig. 12 or in opposition as shown in Fig. 11. It has been found that in certain cases a more sensitive response is obtained by the Fig. 11 form, that is, where the sets of coils are so connected that the E. M. F.'s generated thereby on encountering a flaw are in opposition.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device for detecting flaws in electrical conductors, a detector unit adapted to be moved relative to said conductor, said unit comprising a plurality of detector coils arranged in staggered relation.

2. In a device for detecting flaws in electrical conductors, a detector unit adapted to be moved relative to said conductor, said unit comprising a plurality of pairs of opposed detector coils, said pairs being staggered.

3. In a device for detecting flaws in electrical conductors, a detector unit adapted to be moved relative to said conductor, said unit comprising a plurality of pairs of opposed detector coils, said pairs being spaced laterally across the conductor and the direction of movement so as to co-act with adjacent portions of said conductor.

4. In a device for detecting flaws in electrical conductors, a detector unit adapted to be moved relative to said conductor, said unit comprising a plurality of pairs of opposed detector coils, said pairs being so disposed as to co-act with overlapping portions of said conductor.

5. In a device for detecting flaws in electrical conductors, a detector unit adapted to be moved relative to said conductor, said unit comprising a plurality of pairs of opposed detector coils, said pairs being staggered, the extent of the longitudinal displacement being such that the differential E. M. F. induced in one pair of coils when a flaw is encountered is reinforced by the differential E. M. F. induced in the succeeding pair of coils by said flaw.

6. In a device for detecting flaws in electrical conductors, a detector unit adapted to be moved relative to said conductor, said unit comprising a plurality of detector coils, each of said coils having an independent universal mounting.

7. In a device for detecting flaws in electrical conductors, a detector unit adapted to be moved relative to said conductor, said unit comprising a plurality of pairs of opposed detector coils, said pairs being staggered, each of said coils having an independent universal mounting.

8. In a device for detecting flaws in electrical conductors, a detector unit adapted to be moved relative to said conductor, said unit comprising a plurality of detector coils, and means whereby the axis of each of said coils is maintained a constant distance above said conductor, said last-named means comprising a circular slide carried by the coil and adapted to engage the conductor, said slide being detachably connected to the coil and rotatable with respect thereto to bring a fresh portion of the periphery of said slide into engagement with the conductor.

9. In a device for detecting flaws in electrical conductors, a detector unit adapted to be moved relative to said conductor, said unit comprising a plurality of pairs of opposed detector coils, said pairs being arranged in staggered relation and so connected that the E. M. F.'s generated by said pairs of coils on encountering a flaw are additive.

10. In a device for detecting flaws in electrical conductors, a detector unit adapted to be moved relative to said conductor, said unit comprising a plurality of pairs of opposed detector coils, said pairs being arranged in staggered relation and so connected that the E. M. F.'s generated by said pairs of coils on encountering a flaw are in opposition.

11. In a device for detecting flaws in electrical conductors, a detector unit, said unit and said conductor being adapted to be moved relatively, said unit comprising a plurality of detector coils spaced with respect to each other laterally across said conductor and the direction of said movement.

12. In a device for detecting flaws in electrical conductors, a detector unit, said unit and said conductor being adapted to be moved relatively, said unit comprising a plurality of detector coils spaced with respect to each other laterally across said conductor so as to coact with respective longitudinal portions of said conductor during said movement.

13. In a device for detecting flaws in electrical conductors, a detector unit, said unit and said conductor being adapted to be moved relatively, said unit comprising a plurality of detector coils spaced with respect to each other laterally across said conductor so as to coact with overlapping longitudinal portions of said conductor during said movement.

14. In combination, means adapted to move over the rails for detecting rail flaws, said means including means for supplying current to the rail, a current brush carriage adapted to engage the rail to lead current into and out of the rail, a detector carriage mounted on said current brush carriage, a plurality of detector coils, and means whereby said coils are pivotally mounted on said detector carriage for movement about an axis transverse with respect to the rail and the direction of travel.

15. In combination, means adapted to move over the rails for detecting rail flaws, said means including means for supplying current to the rail, a current brush carriage adapted to engage the rail to lead current into and out of the rail, a detector carriage mounted on said current brush carriage, a plurality of detector coils, and means whereby said coils are pivotally mounted on said detector carriage for movement about two axes, one of said axes being substantially transverse with respect to the rail and the direction of travel and the other of said axes being substantially longitudinal with respect to the rail and the direction of travel.

HARCOURT C. DRAKE.